3,110,805
APPARATUS FOR PHOTOGRAPHIC PRINTING
George D. Currie, Ann Arbor, Mich., assignor to The Bendix Corporation, a corporation of Delaware
Filed Apr. 6, 1960, Ser. No. 20,302
1 Claim. (Cl. 250—65)

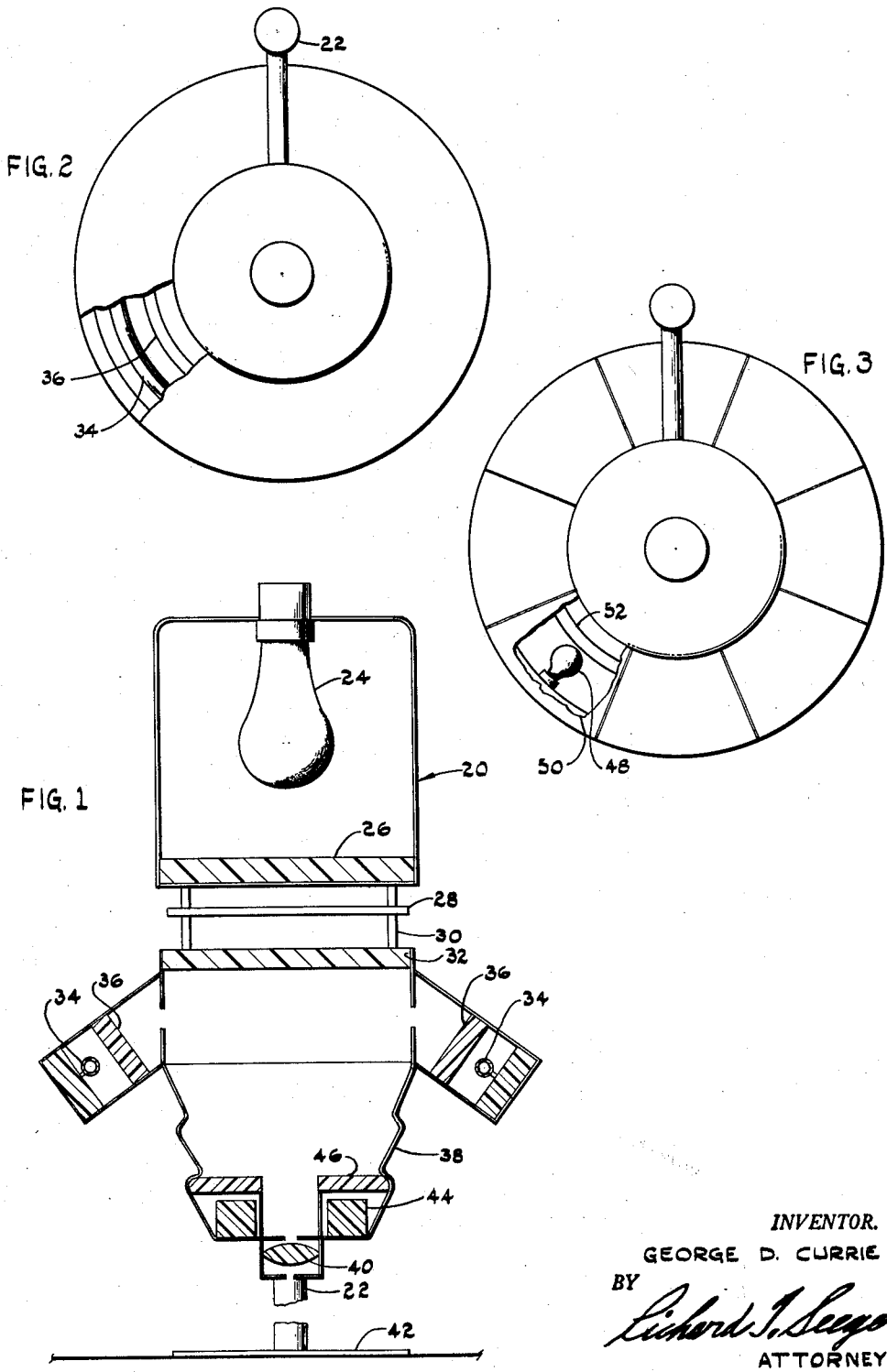

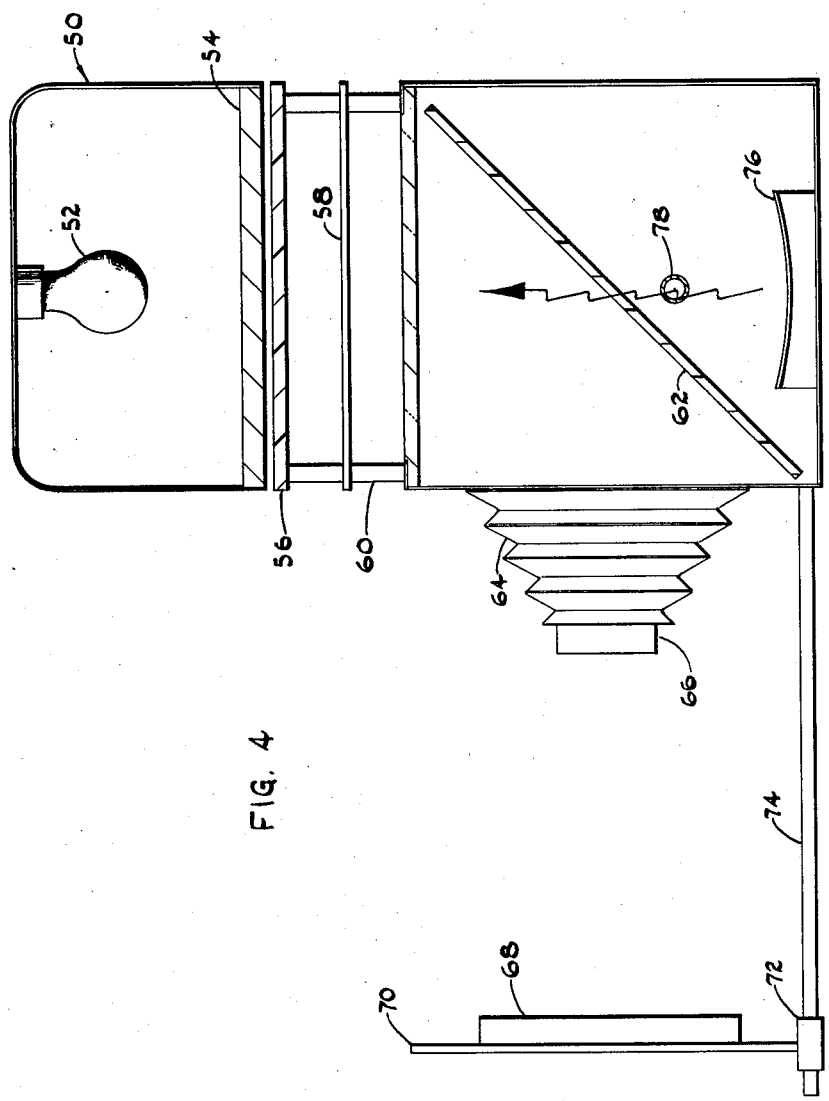

This invention pertains to a method and apparatus for photographic printing and, more particularly, to a method for developing detail in light portions of a sensitized photographic paper.

A method used to develop detail in the light portions of a print or sensitized paper is to activate an infra red "quenchable" phosphor screen with an ultra violet light source causing visible secondary emission or radiation, and then expose a negative and photographic sensitized paper to the visible light radiating from the phosphor screen. On the other side of the paper or positive is placed an infra red light source which is directed through the paper, negative, and to the phosphor screen. Since the infra red light "quenches" or reduces the secondary emission radiating from the phosphor screen, and since the infra red light is shining through the negative and quenching the phosphor screen in amounts according to the transparency of the negative, the more transparent areas of the negative will have less light from the phosphor screen going through and exposing the sensitized paper than the darker portions of the negative and, therefore, relatively more light is available to shine through the darker portions of the negative to develop the detail therein.

This invention effects an improvement by providing means for introducing the infra red light in one embodiment between the negative and the photographic paper, thereby causing less diffusion of the infra red light since it does not have to pass through the paper, and allowing the paper to be placed at various distances from the negative thereby permitting an enlargement from the negative.

It is, therefore, an essential object of this invention to provide a photographic printing apparatus which has an ultra violet light source directed towards an infra red "quenchable" phosphor screen to activate the screen and cause secondary emission of a visible nature therefrom; a negative holder spaced beneath the phosphor screen to receive the visible radiation; an infra red source such as an infra red heating tube placed beneath and around the passage of light through the negative so as not to block this light and directed in a reverse direction through the negative so as to irradiate the phosphor light source; a lens vertically adjustable to receive the visible light shining through the negative; and means to hold a photographic paper on which the light through the lens is focused.

Another object of this invention is to provide an apparatus for photographic printing which has an ultra violet light shining on a phosphor screen, causing secondary emission therefrom of visible light which passes through a negative, below which is placed an interference filter at an angle to the light coming from the negative so that this light is reflected through a lens, which is adjustable along the line of the reflected light, and is focused on enlarging paper. Placed on the other side of the filter in line with the light coming from the negative is an infra red source which emits infra red rays through the filter and the negative to irradiate the phosphor screen and quenching the secondary emission therefrom. This embodiment has the further advantage of directing the infra red radiation from a position which is perpendicular to the surface of the negative so that the phosphor screen will be quenched in closer correspondence to the transparency of the negative.

It is an object of this invention to provide a method of photographic printing which comprises the steps of shining an ultra violet light at an infra red quenchable phosphor screen to cause visible secondary emission radiations from the screen; passing the light radiations through a negative, focusing as with a movable lens the light coming from the negative on a photographic sensitized paper; and shining an infra red radiation from between the negative and lens through the negative on the infra red quenchable phosphor screen from a position which does not interfere with the visible light passing through the negative to the lens.

These and other objects will become more apparent when preferred embodiments of this invention are considered in connection with the drawings in which:

FIGURE 1 is a sectioned schematic view of a photographic enlarger of this invention;

FIGURE 2 is a plan view of the embodiment in FIGURE 1 where the infra red source is a first toroidal infra red radiating element encircling the housing and second toroidal infra red radiating element encircling the lens diaphragm;

FIGURE 3 is a plan view of an embodiment where the first infra red source is a series of infra red lights placed on circumference of a circle around the housing; and FIGURE 4 is a sectioned schematic view of a further embodiment wherein an interference filter is used to reflect light between the negative and enlarging paper and to pass the light between the infra red source and the negative.

In FIGURE 1 is shown a housing 20 which is movably supported on a post 22 and has at one end thereof an ultra violet light source 24. Spaced downwardly from light source 24 is an infra red quenchable phosphor screen 26 which is excited by the ultra violet radiation and emits a visible light which shines through a negative 28 supported in a negative holder 30 which is spaced downwardly from the screen 26. An ultra violet filter 32 blocks any ultra violet light that may come through negative 28 and filter 32 is spaced just below holder 30.

Placed about and just below filter 32 is a toroidal heating element 34 which directs infra red rays through a toroidal filter 36 and then through negative 28 to phosphor screen 26. Irradiating phosphor screen 26 with infra red rays reduces or quenches the visible light radiated from the phosphor screen. The infra red rays first pass through the negative 28 and then quench the phosphor screen 26 in amounts corresponding to the transparency of the negative so that the transparent areas pass more quenching rays than the darker or more opaque areas. This reduces the amount of light shining through the transparent areas and, therefore, allows a proportionately larger amount of light to shine through the darker or more opaque areas to develop the detail therein. The filter 36 is designed to filter out shorter wavelength light including visible light radiating from infra red source 34 to prevent reflecting of short wavelength light from a negative or enlarger parts.

The light shining through negative 28 now passes through an extendable bellows 38 and then through a lens assembly 40 which is attached to lower end of bellows 38. The light is focused on photographic enlarging paper 42 placed below lens assembly 40. Placed about lens assembly 40 is an additional infra red toroidal heating element 44 which shines up through a filter 46 (similar to filter 36) and through negative 28 to phosphor light source 26. By adjusting the position of lens 40 relative to negative 28 and adjusting housing 29 on post 22 relative to paper 42, a predetermined range of enlargements is possible. Also, it is seen that the infra red sources 34 and 44 do not shine through the enlarging paper 42 but directly through the negative 28 to light source 26 to minimize any scattering and resultant blurring.

A second embodiment of this invention (FIGURE 3) has the infra red light source in the form of a series of infra red light bulbs 48 placed on circumference 50 which lies around and outside the passage of light through negative 28 to lens 40. Individual filters 52, which prevent passage of any shorter wavelength light are associated with each infra red light source.

A third embodiment is shown in FIGURE 4 wherein a housing 50 supports an ultra violet light sight source 52 which irradiates a phosphor screen 54, supported therebelow, and causes secondary emission from screen 34 of visible light. Supported in housing 50 below screen 54 is an ultra violet filter 56 which blocks the passage of ultra violet radiation but allows passage of the visible light from screen 54 to negative 58 which is supported by negative holding means 60. The visible light is modified according to the degree of transparency of negative 58 and impinges upon an interference filter 62 which is supported in housing 50 at a 45° angle and reflects the light from negative 58 through a bellows 64 and a lens 66 which focuses the light on enlarging paper 68 held by holder 70. Bellows 64 can be extended so that lens 66 is movable along a horizontal axis and holder 70 is supported on a sleeve 72 through which passes a rod 74, so that paper 68 is also adjustable along a horizontal axis.

Placed below filter 62 is a slightly concave mirror 76 above which is placed an infra red radiator 78 emitting infra red rays which impinge upon filter 62 directly and by means of reflection from mirror 76. Filter 62 is designed so that it can pass infra red radiation, while reflecting visible radiation, to allow infra red radiation to pass through negative 58 and impinge upon phosphor screen 54 to cause quenching of the light source corresponding to the more transparent areas of the negative as explained previously, so that the more dense areas of the negative will receive proportionately more light to develop the detail therein. This embodiment has the further advantage that the infra red radiation approaches the negative 58 from a substantially normal or perpendicular angle so that the phosphor screen 54 is quenched in a manner which corresponds almost exactly with the degree of transparency of negative 58.

Of course, the embodiment shown in FIGURE 4 can be altered by placing the infra red source 78 on the same side of the filter as is negative 58, and in the place now occupied by the paper holder 70, and then moving bellows 64, lens 66, and paper holder 70 below the interference filter 62, in the position which was occupied by bulb 78. This reversal of positions would require that the position of the interference filter also be changed so that it would reflect the infra red radiation and it would pass visible radiation.

Although this invention has been disclosed and illustrated with reference to particular applications, the principles involved are susceptible of numerous other applications which will be apparent to persons skilled in the art. The invention is, therefore, to be limited only as indicated by the scope of the appended claim.

Having thus described my invention, I claim:

Apparatus for photographic printing comprising an infra red quenchable phosphor screen,
means for causing visible secondary emission of said screen,
means for holding a negative to receive the secondary emission of said screen,
means for holding sensitized photographic printing paper to receive the visible emission after it has passed through said negative,
lens holding means interposed said negative and paper holding means,
infra red ray generating means,
said infra red ray generating means being placed out of the path of the visible light rays between said negative holding means and said lens holding means,
said infra red ray generating means substantially encircling said light ray path and being directed towards said negative holding means to cause an even distribution of infra red light to pass through said negative holding means and impinge upon said infra red quenchable phosphor screen.

References Cited in the file of this patent
UNITED STATES PATENTS

| | | |
|---|---|---|
| 2,482,815 | Urback | Sept. 17, 1949 |
| 2,521,953 | Tuttle | Sept. 12, 1950 |
| 2,988,978 | Craig | June 20, 1961 |
| 2,996,617 | Heckscher | Aug. 15, 1961 |

FOREIGN PATENTS

| | | |
|---|---|---|
| 1,002,056 | France | Mar. 3, 1952 |